M. W. INGRAHAM.
NUT LOCK.
APPLICATION FILED NOV. 18, 1910.
995,066. Patented June 13, 1911.
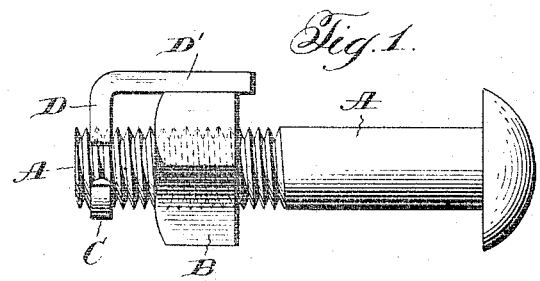
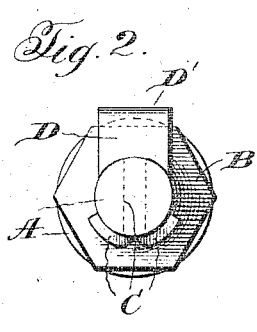 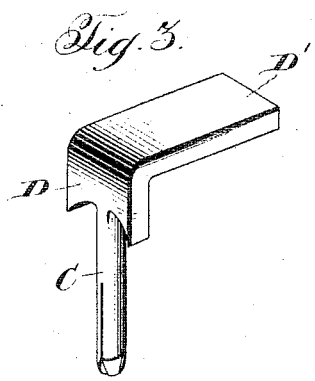
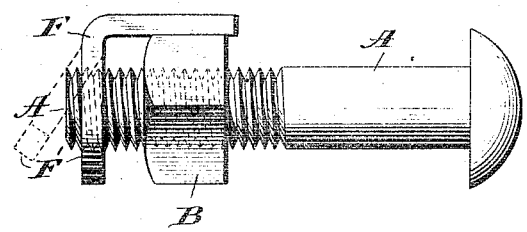 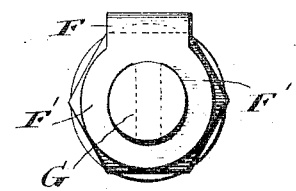
Witnesses:
Jas. E. Hutchinson
Thos. R. Heath
Inventor:
Matthew W. Ingraham,
By Bacon & Milans Attorneys

UNITED STATES PATENT OFFICE.

MATTHEW W. INGRAHAM, OF GLACE BAY, NOVA SCOTIA, CANADA.

NUT-LOCK.

995,066. Specification of Letters Patent. Patented June 13, 1911.

Application filed November 18, 1910. Serial No. 593,114.

*To all whom it may concern:*

Be it known that I, MATTHEW W. INGRAHAM, a subject of the King of Great Britain, residing at Glace Bay, in the county of Cape Breton, Province of Nova Scotia, Canada, have invented certain new and useful Improvements in Nut-Locks, of which the following is a specification, reference being had therein to the accompanying drawing.

This invention relates to an improvement in nut locks and it is embodied in the construction hereinafter described and defined in the claims.

It is now well known that to secure a nut on a bolt against accidental loss or escapement, what is known as a cotter pin is largely employed. By using a cotter pin which is projected through a perforation in the end of the bolt, there is secured the advantages of preventing accidental loss of the nut, while on the other hand, upon tightening the nut the cotter pin does not and cannot serve as a means for securing or holding the nut in its adjusted position on the bolt.

My invention is designed primarily to provide a pin securing device which will prevent the escape of the nut from the bolt and which will also be provided with means for holding the nut in its various positions of adjustment.

Heretofore, it has been suggested to form a split pin or cotter pin with a projection having arms embracing a nut. In such constructions, it was necessary to embrace the nut to prevent the nut holder from turning laterally. This embracing feature necessarily involved the requirement of differently formed embracing parts, the formation being that to accord with the peculiar or special character of the nut.

My invention is designed to be applicable to any form of nut and is intended to avoid the necessity of embracing securing projections and still at the same time to preserve the advantages and secure a very rigid structure of the pin type, the structure being adapted to hold the nut in its different positions of adjustment, to be easily applied and to be very cheaply manufactured.

In the accompanying drawing, I have shown the preferred and modified form of the invention, but it is to be understood that various changes can be made without departing from the nature and principle thereof.

Figure 1 is a side elevation of the improvement applied to a bolt with the nut thereon, Fig. 2 is an end view of the same, Fig. 3 is a perspective view of the article, Fig. 4 is a view of a modified form in side elevation, and Fig. 5 is an end elevation.

A designates a bolt of any convenient formation having a threaded end part and B represents a nut. The end of the bolt is perforated in a well known manner.

The securing pin forming the subject matter of the invention comprises substantially a pin part C conveniently of the split type and of a length sufficient to project through the opening in the bolt and beyond the same, so that the extreme end parts can be turned up in opposite directions, as is usual. The pin C has an enlarged head part D of a width substantially that of the diameter of the bolt. This head part is fashioned on its lower edge to fit substantially the contour of the bolt. Thereby when the pin is in position on the bolt, the head will embrace opposite sides of the bolt. Extending at right angles conveniently from the upper part of the head is a flat arm portion D', the length of which may be varied according to the conditions and requirements of use. The length of the head is by preference substantially such as to carry the arm D directly above a flat part or wrench hold portion on the nut, so that when in use the flat arm portion will bear directly on the nut and thereby prevent any turning of the nut on the bolt.

In application, when the nut has been tightened up sufficiently on the bolt to suit the requirements, the pin is passed through the opening in the bolt and the head is drawn down onto the bolt, the lower end of the pin being separated and bent up so as to lock the head firmly in position. In this position, the arm will project over the wrench hold portion of the nut and thereby hold it firmly in position. Any lateral movement or tendency to movement is resisted by the bolt spanning part of the head. It will also be observed that by this construction any tendency of the pin to be bent or broken is materially resisted by the head part and thereby a very strong and rigid structure is provided. It will also be noted that by having a single arm member, nuts of different types may be secured in position, it being necessary only to project the arm over one of the flat surfaces of the nut.

I do not wish to be limited to the special construction shown, as the rigidly secured pin and nut fastener may be varied more or less and in this connection were it found desirable, the shape of the arm for certain purposes could be changed so that parts other than the single flat portion of the nut construction might be employed, while the connecting head and its function would still remain the same, rendering the device strong and preventing any substantial or objectionable movements of the securing device of the bolt.

In Figs. 4 and 5, I have shown a slightly modified form wherein the head member F has side extensions F′ projected down substantially in ring form to extend below the bolt when bent over. Directly below the head part is the pin G entering the opening or perforation in the bolt. In applying this modified form, the ring-extension of the head is conveniently made to stand outward, as shown in dotted lines, the pin being inserted in the opening in the bolt. The ring part of the head is by suitable pressure bent inwardly around the end of the bolt. This prevents the escape of the pin from the opening and retains the arm in position against lateral movement.

Having thus described the invention, what is claimed as new and desired to be secured by Letters Patent is:

1. In a device of the character described, a pin part adapted to be passed through an opening in a bolt, a head at the upper end of the pin having parts designed to embrace the bolt and a securing arm part extending outwardly from the head adapted to overlie a nut on the bolt and secure the same in position.

2. As an article of manufacture, a nut locking device comprising a head shaped to engage a bolt, a split pin extending from the head, and a nut securing arm extending outwardly at an angle to the head, substantially as described.

3. The combination with a bolt having a perforated end part and a nut on the bolt, of a nut locking device having a pin part extending through the perforation, a head part from which the pin extends and fashioned to fit the upper surface of the bolt, and an arm extending longitudinally of the bolt from the head part.

4. In a nut locking device, the combination with a bolt and a nut, the former having a perforation therein, of a device for securing the nut in position and against removal comprising a head part embracing the sides of the bolt and having a centrally arranged pin adapted to pass into said perforation, and a flat arm extending from the head-part longitudinally of the bolt and overlying the nut, substantially as described.

5. The combination with a bolt and nut, the former having a perforation therein, of a device for securing the nut in position and against removal comprising a head part to embrace the bolt, a pin extending from the head to be passed through the bolt aperture and provided with an end portion to be bent out of alinement with the bolt aperture, and a securing portion extending from the head to overlie the nut on the bolt and hold the same in position.

In testimony whereof I affix my signature in presence of two witnesses.

MATTHEW W. INGRAHAM.

Witnesses:
L. S. BACON,
CALVIN T. MILANS.